US007600404B2

(12) United States Patent
Prevey, III

(10) Patent No.: US 7,600,404 B2
(45) Date of Patent: Oct. 13, 2009

(54) SURFACE TREATMENT APPARATUS AND METHOD

(75) Inventor: Paul S. Prevey, III, Cincinnati, OH (US)

(73) Assignee: Surface Technology Holdings, Ltd., Cincinnati, OH (US)

( * ) Notice: Subject to any disclaimer, the term of this patent is extended or adjusted under 35 U.S.C. 154(b) by 350 days.

(21) Appl. No.: 11/400,502

(22) Filed: Apr. 7, 2006

(65) Prior Publication Data

US 2007/0234772 A1    Oct. 11, 2007

(51) Int. Cl.
    *B21D 17/04* (2006.01)
(52) U.S. Cl. .............................. 72/75; 72/11.1; 72/17.1; 72/17.3; 72/20.1; 72/416
(58) Field of Classification Search ............ 72/20.1, 72/20.2, 75, 412, 416, 441, 446, 8.3, 10.1, 72/11.1, 11.2, 13.4, 16.1, 16.2, 17.1, 17.3, 72/31.07; 73/81, 82, 85; 29/90.01
See application file for complete search history.

(56) References Cited

U.S. PATENT DOCUMENTS

| | | | |
|---|---|---|---|
| 1,784,866 A | 12/1930 | Fahrenwald | |
| 1,986,426 A | 1/1935 | De Bats | |
| 3,110,086 A | 11/1963 | Philips | |
| 3,434,327 A | 3/1969 | Speakman | |
| 3,937,055 A | 2/1976 | Caruso et al. | |
| 4,641,510 A | 2/1987 | Mitsching et al. | |
| 5,771,729 A | 6/1998 | Bailey et al. | |
| 5,826,453 A | 10/1998 | Prevey, III | |
| 6,247,355 B1 * | 6/2001 | Suresh et al. | 73/82 |
| 6,622,570 B1 * | 9/2003 | Prevey, III | 73/826 |
| 6,851,300 B2 * | 2/2005 | Kwon et al. | 73/85 |
| 7,188,398 B2 * | 3/2007 | Prevey | 29/90.5 |
| 7,424,822 B2 * | 9/2008 | Isomoto | 73/81 |
| 2003/0213280 A1 * | 11/2003 | Easterbrook et al. | 72/412 |

OTHER PUBLICATIONS

International Search Report and Written Opinion under the PCT for corresponding patent application, dated Oct. 23, 2008, 8 pages.

* cited by examiner

*Primary Examiner*—Edward Tolan
(74) *Attorney, Agent, or Firm*—Mark F. Smith; Smith Brandenborg Ltd

(57) ABSTRACT

The present invention relates to a surface treatment apparatus and method for inducing compressive residual stress in the surface of a workpiece with dimensional variations. The method comprises the acts of measuring the dimensions of the workpiece during a surface treatment operation and adjusting the surface treatment process parameters to account for the measured dimensions. In one embodiment, the apparatus comprises two surface treatment elements oriented in opposition to one another in a caliper configuration. The surface treatment elements are positioned and impinged against the surface of a workpiece by an actuator controlled by a computer control unit. The depth to which the surface treatment elements are impinged is precisely controlled to achieve the desired magnitude and depth of compressive residual stress. A sensor operatively connected to the apparatus senses and relays the dimensions of the workpiece to a computer control unit that adjusts the operating parameters accordingly.

5 Claims, 7 Drawing Sheets

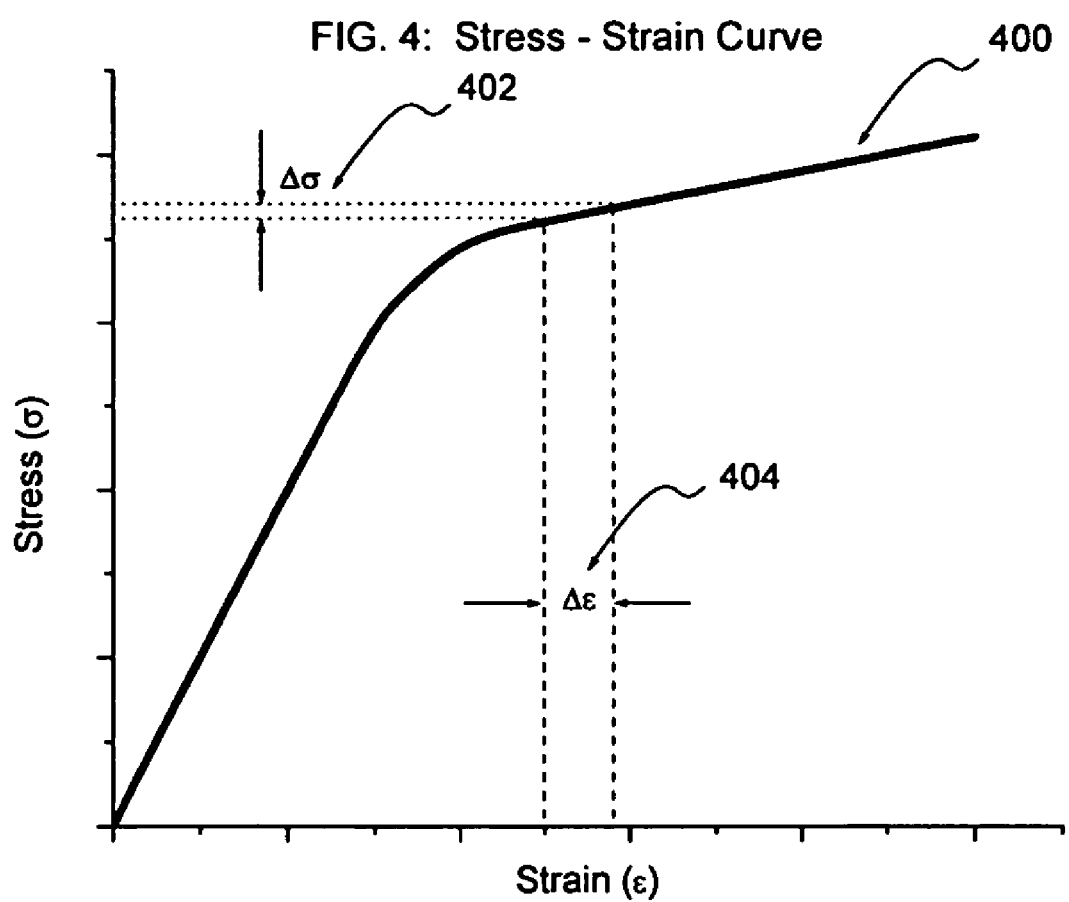

FIG. 5 preliminary steps to one embodiment
of the method of performing a surface treatment operation.
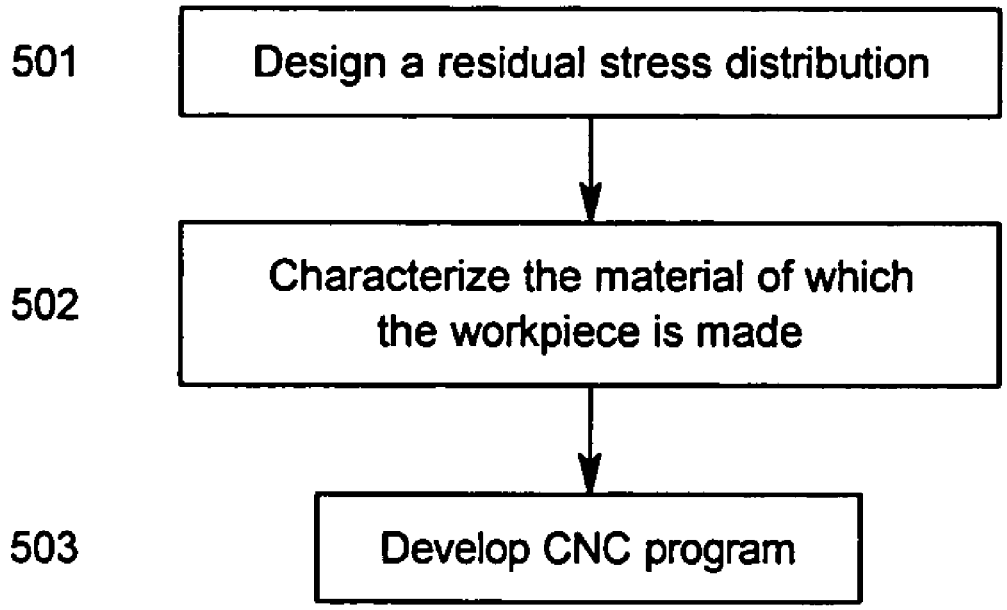

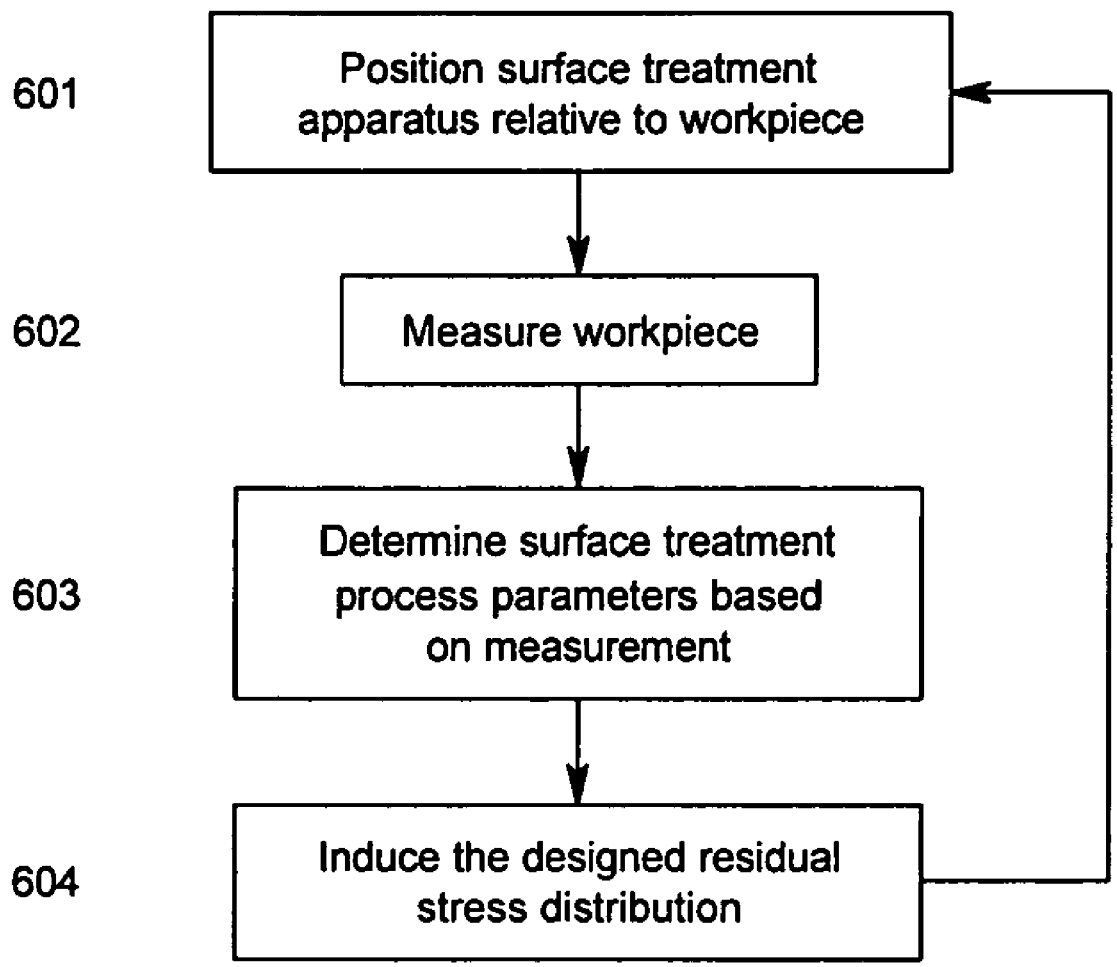
FIG. 6: Flow diagram of one embodiment of the method of performing a surface treatment operation

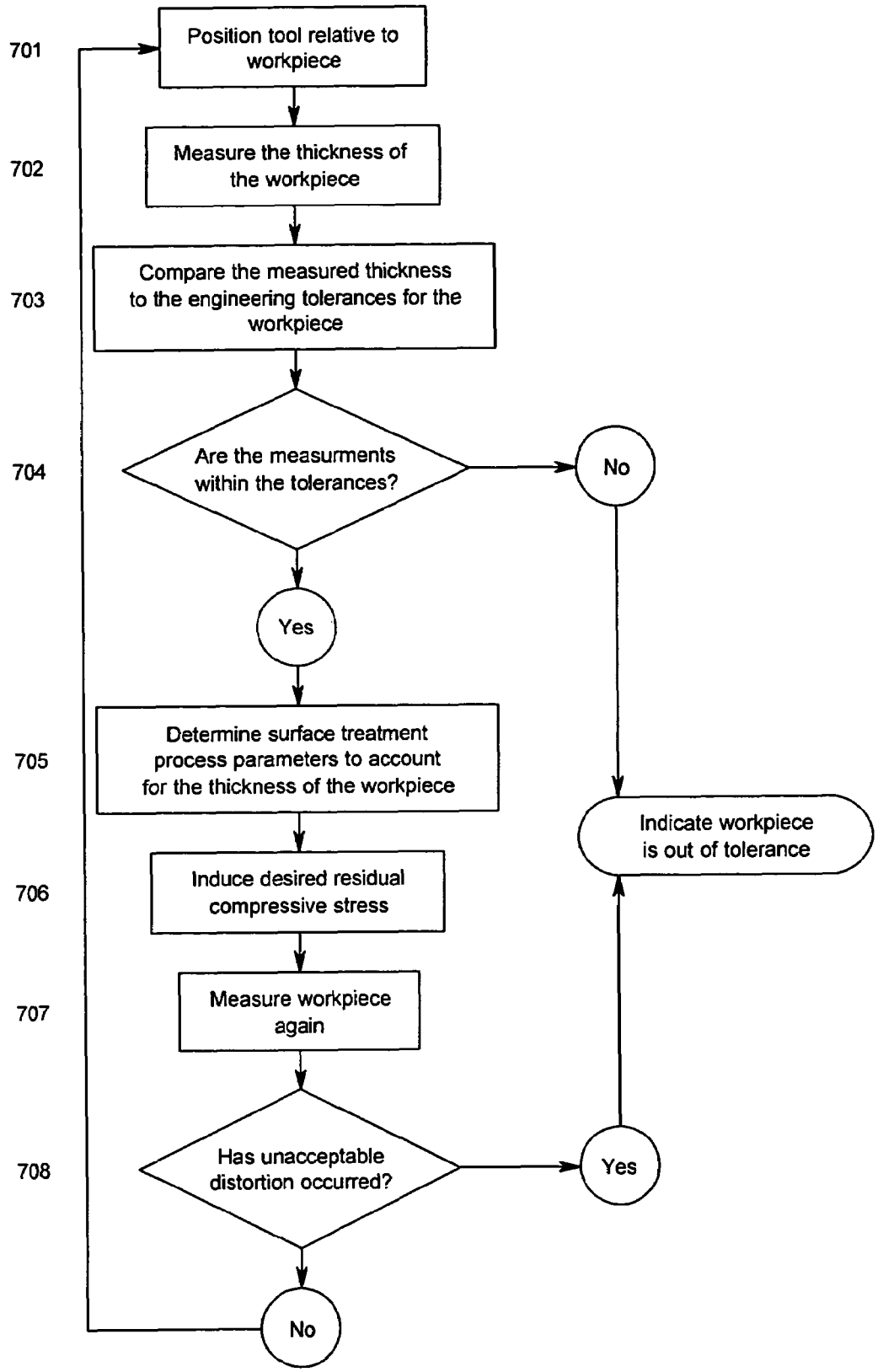
FIG. 7 Flow diagram of one embodiment of the method of performing a surface treatment operation

SURFACE TREATMENT APPARATUS AND METHOD

BACKGROUND OF THE INVENTION

This invention relates to a surface treatment apparatus and, more particularly, to an apparatus for inducing compressive residual stresses whereby the apparatus is capable of sensing variations in workpiece thickness and adjusting the applied surface treatment process parameters, such as the depth to which surface treatment elements are impinged, in response to such variations so that the desired depth and magnitude of compressive residual stress is induced in the surface of a workpiece. The invention also relates to a method of performing surface treatments whereby variations in workpiece dimensions are accounted for during the surface treatment process.

The high vibratory and tensile stresses experienced by rotating turbo machinery in operation, particularly the blading members of the fan, compressor, and turbine stages in gas turbine engines, make such components susceptible to high cycle fatigue (HCF) and other stress related failure mechanisms such as stress corrosion cracking (SCC). HCF and SCC ultimately limit the service life of these components as prolonged exposure to such extreme operating conditions leads to the development of fatigue cracks in areas of the component subject to high operational stresses. The fatigue life of a component is further limited by the occurrence of foreign object damage (FOD). FOD locations act as stress risers or stress concentrators that hasten the development and propagation of fatigue cracks. FOD, especially along the leading and trailing edges of blading members, significantly reduces the service life of aerospace components.

The impact of HCF, SCC, and FOD can be minimized and the service life of the component improved by using surface treatments to introduce compressive residual stresses in the surface of the component. Compressive residual stresses are commonly introduced in critical areas of the component that are subject to high operational stresses and/or damage and are therefore prone to fatigue failure. Such areas include the edges and tips of blading members. Introducing compressive residual stresses improves the fatigue properties and foreign object damage tolerance of both new and previously fielded blading members. The improvement in component properties through the introduction of compressive residual stresses decreases operation and maintenance costs and improves the flight readiness of the aircraft in which the component is employed. Common methods of introducing beneficial compressive residual stresses in aerospace components include laser shock peening (LSP), shot peening, pinch peening, glass bead peening, and burnishing.

Despite being well known in the art, such methods of inducing compressive residual stress can be difficult to implement, particularly with respect to vanes and blading members used in gas turbine engines. The difficulty lies not with the method of inducing the compressive residual stresses, but is instead related to the dimensional variations encountered within a single component as well as variations between individual components.

Current practices for the manufacture of fan and turbine blades and vanes for use in gas turbine engines allow for some dimensional variation. For example, in the case of some titanium alloy blades, variations in thickness on the order of several thousandths of an inch may be acceptable along the leading and trailing edges of the blade. Further, it is common practice to accept larger variations, in some cases nearly doubling the engineering tolerances, where the variations in thickness are in areas of the blade that are subject to lower stresses, such as near the tip of the blade. This practice is especially common where the manufacturer has invested significant resources in manufacturing the component such as with integrally bladed components and other complex components manufactured by electro-chemical machining.

Additional variations in the dimensions of the component may be introduced during the reworking or reconditioning of a blade or vane. FOD, such as nicks and dents along the edges of the blade, acts as a stress concentrator and may provide a location for crack initiation and growth that can ultimately lead to the failure of the component. Blades and vanes subject to FOD may be returned to service provided the damage can be removed through reworking or reconditioning the blade edge. In reworking the blade, the damaged area is removed by grinding or filing the edge of the blade around the damaged material and blending the material to facilitate a smooth transition between the original edge and the newly repaired area. The practice of grinding and blending effectively shifts the edge of the blade in the repaired area back from the original edge. Because the thickness of blades and vanes generally increases along the chord-wise direction towards the center of the airfoil and away from the leading and trailing edges, the edge of the repaired area is generally thicker than the surrounding areas.

Variations in the thickness of a blade or vane, regardless of the source, can adversely impact the benefit of compressive residual stresses induced in the blade. In general, a compressive residual stress distribution for a particular component is designed based on factors including the material from which the component is made, the applied and residual stresses to which the component is subject, and the dimensions of the component. The compressive residual stress distribution is designed such that a given magnitude of compression will extend to a specified depth beneath the surface of the part. For applications such as the edges of blades and vanes, it may be desirable to induce a compressive residual stress substantially through the entire thickness of the component over specified chord- and span-wise directions of the airfoil. Once the compressive residual stress distribution has been designed, process parameters are developed to induce the compressive residual stress distribution in the component.

Where variations in thickness are present, the surface treatment process parameters selected may be inadequate to produce the designed residual stress distribution. If the component is thicker than anticipated, the induced compressive residual stress may not reach the desired depth, have the desired magnitude, or extend through the thickness of the component where called for. Alternatively, if the component is thinner than anticipated, the amount of material in the treated area may not be sufficient to accommodate or compensate for reacting tensile stresses that accompany the introduction of compressive residual stress leading to buckling or distortion in the component.

One method currently employed to account for variations in thickness and dimension involves the use of a coordinate measuring machine (CMM) or similar apparatus before application of the surface treatment to precisely measure the dimensions of the component and identify any dimensional variations. Adjustments can then be made to the process parameters to account for any identified variations such that the processed component has the desired compressive residual stress distribution. While this method is effective, it has one significant disadvantage: the act of measuring prior to treatment adds an additional step to the surface treatment process that may as much as double the surface treatment process time.

Another problem associated with the introduction of compressive residual stress involves the ability to precisely control the applied stress or force of the surface treatment process so as to obtain the desired compressive residual stress. As shown in FIG. 4, for some materials, a small increase in the applied stress causes a substantial increase in the corresponding strain or deformation that develops in the material. This is schematically illustrated by the stress-strain curve 400 where a small increase in the applied stress ($\Delta\sigma$) 402 causes a substantial increase in the induced strain ($\Delta\epsilon$) 404. Because the induced strain, which is essentially the deformation of the material caused by the applied stress, is directly related to the residual compressive stress induced in the material, precise control over the applied stress may be necessary to achieve the desired residual compressive stress where small incremental changes in the applied stress cause comparatively large changes in the developed strain or displacement. However, it may be difficult to obtain the necessary precision over the applied stress to accurately control the induced compressive residual stress.

Therefore, a need exists for an efficient, easily incorporated surface treatment apparatus and method for identifying dimensional variations in components during a surface treatment process so that the surface treatment process parameters can be adjusted and the desired compressive residual stress distribution achieved with a high degree of precision.

SUMMARY OF THE INVENTION

The present invention satisfies the need for an efficient, easily incorporated surface treatment apparatus and surface treatment method capable of determining the dimensions of a component during a surface treatment operation so that the surface treatment process parameters can be adjusted during treatment and the desired compressive residual stress distribution achieved.

In one embodiment, the invention is a surface treatment apparatus for inducing compressive residual stresses in a workpiece. The apparatus includes at least one sensor for sensing the dimensions of the workpiece during a surface treatment operation and at least one element for inducing compressive residual stress in the surface of the workpiece.

In another embodiment, the invention is a method for monitoring the dimensions of a workpiece during a surface treatment operation. The method includes measuring the workpiece during a surface treatment operation and adjusting the surface treatment process parameters relative to the measured dimensions. The desired compressive residual stress is then induced in the surface of the workpiece.

In another embodiment of the method of the current invention, the desired compressive residual stress is induced in the workpiece by controlling the depth of impingement of surface treatment elements as they contact the surface of the workpiece.

In another embodiment, the invention is a method for monitoring dimensional variations in a workpiece during a surface treatment operation. The method includes measuring the workpiece during a surface treatment operation and comparing the measurements to specified print dimensions for the workpiece. The surface treatment process parameters are adjusted to account for dimensional variations and the desired compressive residual stress is induced in the surface of the workpiece.

In another embodiment, the invention is a method for monitoring dimensional variations in a workpiece during a surface treatment operation. The method includes measuring the workpiece during a surface treatment operation and comparing the measurements to specified print dimensions for the workpiece. Where dimensional variations in the workpiece are outside of the specified print dimensions, remedial measures are taken to correct the variations or else the workpiece is discarded.

In another embodiment, the invention is a method for monitoring the dimensions of a workpiece during a surface treatment operation. The method includes monitoring and measuring the dimensions of the workpiece and distortions in the workpiece caused by the surface treatment operation. Where the distortions occur beyond specified tolerances, remedial measures are taken or else the workpiece is discarded.

One advantage of the present invention is the ability to measure the dimensions of a workpiece in real time during a surface treatment operation. This eliminates the need to perform separate measurement steps before and/or after the surface treatment operation and thereby decreases overall processing time for the surface treatment operation.

Another advantage of the present invention is the ability to adjust surface treatment processing parameters in real time based upon the measured dimensions of the workpiece. This permits the desired depth and magnitude of compressive residual stress to be induced in the workpiece by adjusting the surface treatment processing parameters relative to the measured dimensions of the workpiece during processing.

Another advantage of the present invention is the ability to control the compressive residual stress induced in the workpiece by monitoring the depth of impingement of surface treatment elements rather than the force with which the surface treatment elements are impinged.

Another advantage of the present invention is the ability to measure the dimensions of a workpiece in real time during a surface treatment operation as a quality control measure. Dimensional variations beyond specified tolerances are identified and appropriate measures taken to either remedy the variation or else discard the workpiece.

BRIEF DESCRIPTION OF THE DRAWINGS

These and other features, aspects, and advantages of the present invention will become better understood with regard to the following description, appended claims, and accompanying drawings where:

FIG. 4 is a stress-strain curve showing that a small change in the applied stress may cause a relatively large change in the induced strain.

FIG. 5 is a flow diagram of the preliminary steps of one embodiment of the method of performing a surface treatment operation.

FIG. 6 is a flow diagram of one embodiment of the method of performing a surface treatment operation.

FIG. 7 is a flow diagram of another embodiment of the method of performing a surface treatment operation.

DETAILED DESCRIPTION OF THE INVENTION

Figure 1:
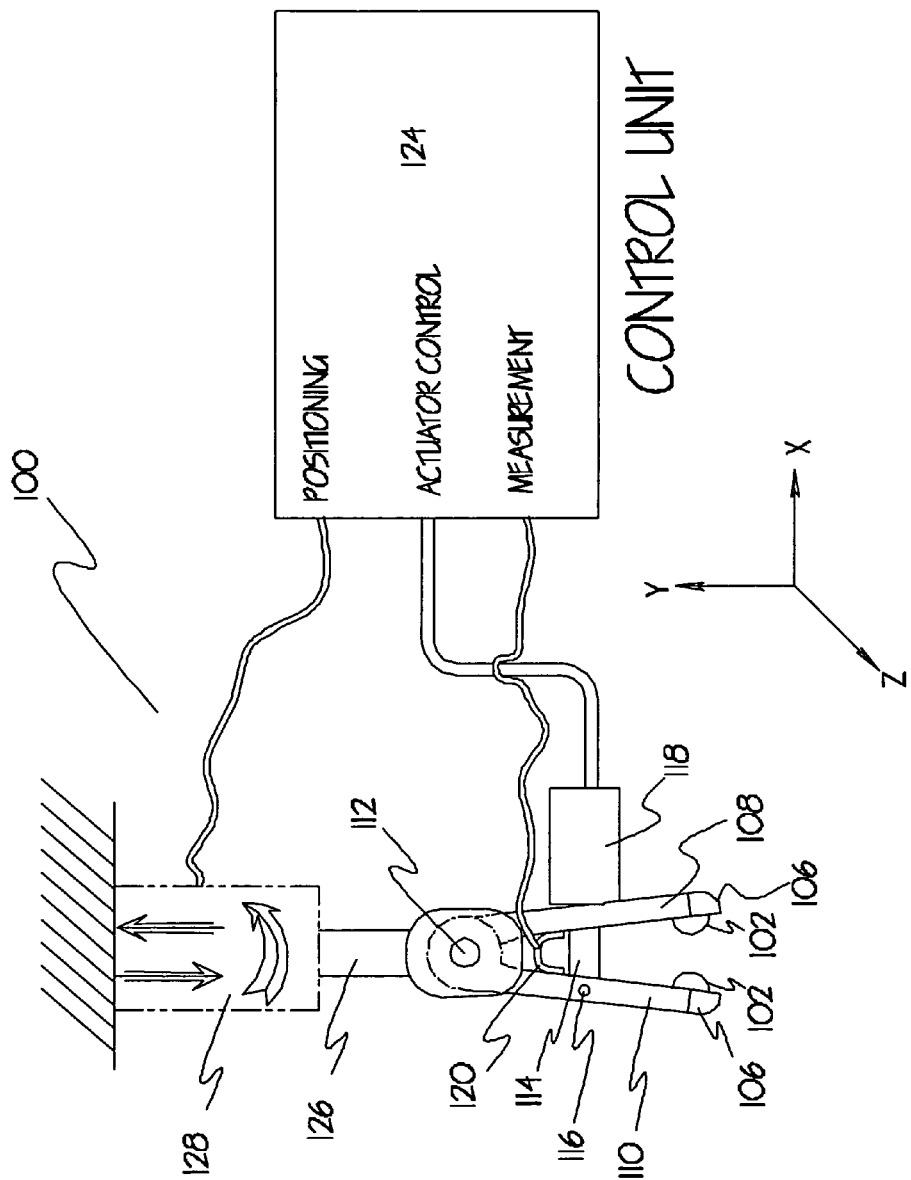
FIG. 1 is a schematic diagram of one embodiment of the surface treatment apparatus.

Referring to the embodiment of the present invention shown in FIG. 1, the apparatus 100 is comprised of surface treatment elements 102 for inducing compressive residual stress in the surface of a workpiece disposed within the tip portions 106 of a first arm 108 and a second arm 110. The first arm 108 and second arm 110 are oriented in a caliper-configuration such that the surface treatment elements 102 are in direct opposition to one another. The first arm 108 and second arm 110 are disposed within a base 126 for attaching the apparatus to a positioning device 128 such that the first arm 108 and second arm 110 are free to rotate relative to the base 126. A linkage 114 extends freely through the first arm 108 and terminates at a pivoting pin connection 116 in the second arm 110 thereby mechanically linking the first arm 108 to the second arm 110. An actuator 118 attached to the first arm 108 actuates the linkage 114 thereby moving the first arm 108 and second arm 110 in proximity to one another. A sensor 120 interposed between the first arm 108 and the second arm 110 senses the relative displacement of the first arm 108 and the second arm 110.

In another embodiment of the invention, the sensor 120 may be disposed along the linkage 114. In another embodiment of the invention, the sensor may be disposed within the actuator 118 and senses the displacement between the first arm 108 and the second arm 110 according to the position of the actuating mechanism. In another embodiment of the invention, a sensor may be disposed along a pivot point 112 connecting the first arm 108 and the second arm 110. The sensor senses the deflection of the first arm 108 or second arm 110 as they rotate about the pivot point 112.

A computer control unit 124 is operatively connected to the sensor 120 and in fluid communication and/or electrical communication with the actuator 118. The computer control unit is also in electrical communication with the positioning device 128 and controls the motion of the apparatus 100 relative to the workpiece (not shown). The computer control unit 124 also computes and regulates the surface treatment process parameters that govern the impingement of the surface treatment elements 102 against the workpiece. As such, the computer control unit 124 controls the depth and magnitude of the compressive residual stress induced in the workpiece (not shown). Further, the computer control unit 124 receives a signal from the sensor 120 that corresponds to the dimensional characteristics of the workpiece at a specific location.

The surface treatment elements 102 may be selected from the list including, but not limited to, pinch-peening elements, impact-peening elements, deep rolling elements, coining elements, and burnishing elements. The surface treatment elements 102 shown in FIG. 1 are spherical, hydrostatically-supported burnishing elements oriented in hemispherical sockets at the tips 106 of the first arm 108 and second arm 110.

The actuator 118 for impinging the surface treatment elements 102 against the surface of the workpiece may be selected from the list including, but not limited to, pneumatic cylinders, hydraulic cylinders, solenoids, electro-magnetic actuators, and mechanical actuators.

The sensor 120 for sensing the relative displacement of the first arm 108 and the second arm 110 is selected from the list including, but not limited to, strain gages, transducers, linear variable differential transformers (LVDT), resistive sensors, capacitive sensors, inductive sensors, ultrasonic sensors, optical sensors, mechanical sensors, pneumatic sensors, and hydraulic sensors.

The positioning device 128 may be a robotic arm, computer numeric controlled (cnc) machine tool, or other similar device.

Figure 2:
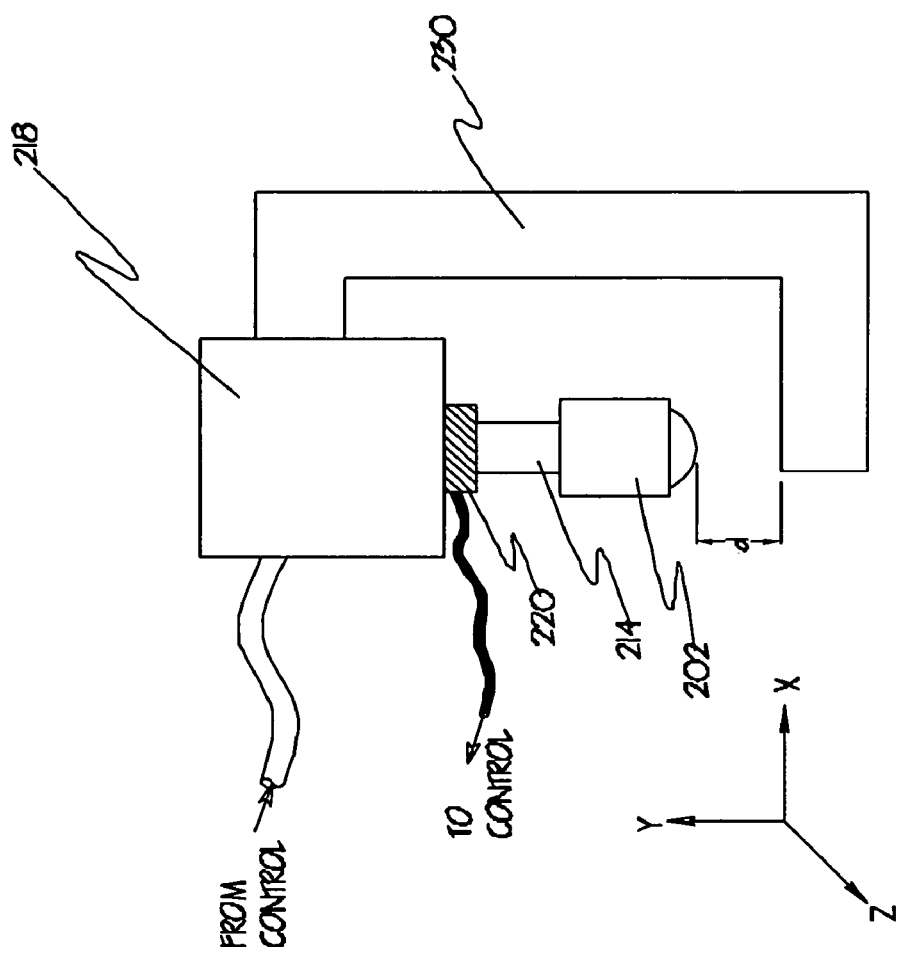
FIG. 2 is a schematic diagram of another embodiment of the surface treatment apparatus.

In another embodiment, shown in FIG. 2, the apparatus of the current invention comprises a single surface treatment element 202 such as a burnishing element, attached to an actuator 218 via a linkage 214. A support 230 for supporting a workpiece is rigidly connected to the actuator 218. A sensor 220 is disposed along the linkage 214 between the actuator 218 and the surface treatment element 202 senses the displacement "d" of the surface treatment element relative to the support in the y direction.

Figure 3:
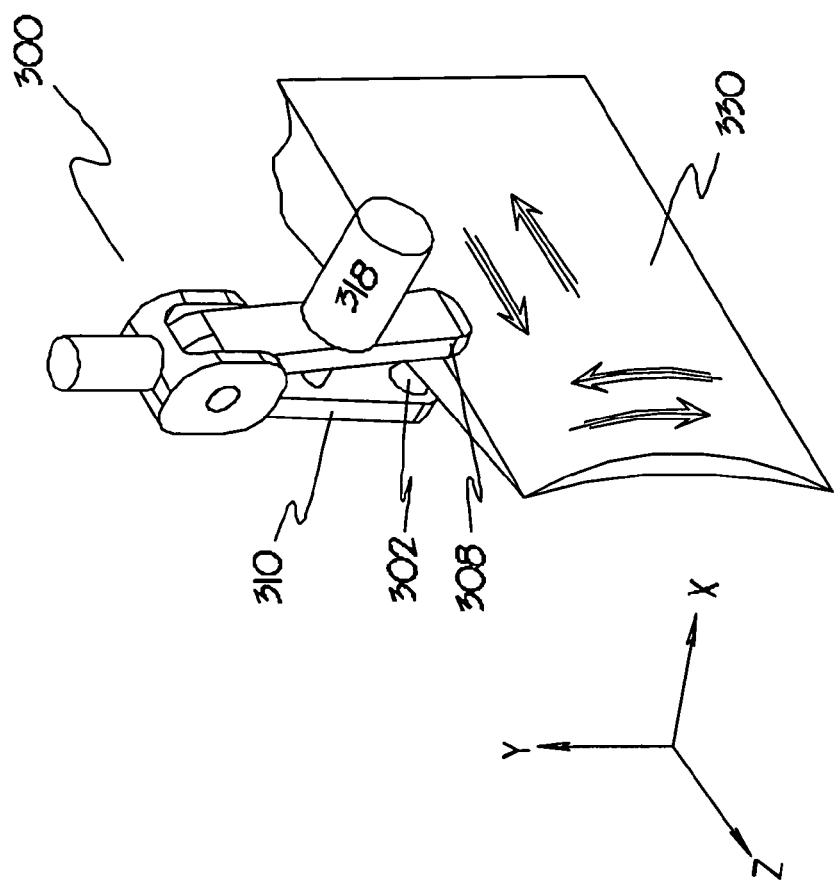
FIG. 3 is a schematic diagram showing the apparatus of FIG. 1 being used to perform a treatment operation.

FIG. 3 shows one version of using the apparatus of FIG. 1. In FIG. 3 the apparatus 300 is being used to treat a workpiece 330 of varying dimension. The workpiece 330 has dimensional variations in both the y- and z-directions. The apparatus 300 is positioned relative to the workpiece 330 such that the first arm 308 and the second arm 310 are on opposite sides of the workpiece 330, thereby facilitating the simultaneous treatment of both surfaces. By adjusting the force exerted on the arms by the actuator 318, the first arm 308 and the second arm 310 are positioned such that the surface treatment elements 302, in this case spherical, hydrostatically supported burnishing elements, are in contact with the surface of the workpiece 330.

Once in position, the apparatus 300 is moved over the surface of the workpiece. In one embodiment, the motion of the apparatus over the workpiece is continuous, such as when the surface treatment elements 302 are spherical, hydrostatically supported burnishing elements. As the apparatus is moved over the workpiece 330, the relative displacement of the first arm 308 and the second arm 310, which corresponds to the thickness of the workpiece 330, is continuously monitored by the sensor (not shown) disposed between the first arm 308 and the second arm 310. In one embodiment, the output of the sensor is then relayed to the computer control unit (not shown) that determines the appropriate surface treatment process parameters to apply to the workpiece 330 based upon the measured dimensions in order to obtain the desired compressive residual stress at that location. In another embodiment, the computer control unit compares the output of the sensor to the specified print dimensions and adjusts the process parameters accordingly. The desired compressive residual stress is then induced in the workpiece 330 by applying the appropriate operating parameters in the operation of the actuator 318 that, in turn, impinges the surface treatment elements 302 into the surface of the workpiece 330.

It is to be understood that, while the apparatus may be used to induce compressive residual stress continuously, such as when the surface treatment elements 302 are hydrostatically supported burnishing elements, it may also be used to induce compressive residual stresses in separate and discrete impinging operations, such as when the surface treatment elements 302 are fixed, hemispherical pinch peening elements or similar surface treatment elements. Where hemispherical pinch peening elements are used, the surface treatment elements are impinged against the surface of the workpiece in separate and discrete locations after the surface treatment process parameters have been adjusted to account for the measured dimensions. The apparatus is then positioned at a new location and the measuring and impinging operation is repeated. The position and spacing of impingement locations may be predetermined in order to impart the desired compressive residual stress or may be variable according to the measured dimensions of the workpiece and determined by the computer control unit.

In another embodiment of the current invention, the displacement of the surface treatment apparatus relative to the surface of the workpiece is used for process control. Referring again to FIG. 3 to illustrate the operability of this embodiment, the apparatus is positioned relative to the workpiece 330 such that the surface treatment elements 302 are in contact with the surface of the workpiece 330. The thickness of the workpiece 330 at the point of contact is determined by the relative displacement of the first arm 308 and the second arm 310. Based on the thickness and the strain characteristics of the material, the computer control unit determines an optimum material displacement that will produce the desired residual compressive stress. The material displacement is related to the depth to which the surface treatment elements 302 are impinged against the surface of the workpiece 330. The surface treatment elements 302 are then impinged against the surface of the workpiece 330 to a specified depth, as determined by the control unit (not shown) and measured by the relative displacement of the first arm 308 and the second arm 310, to induce the desired residual compressive stress.

In another embodiment of the present invention, the surface treatment apparatus is used to detect distortions in the workpiece caused by the surface treatment operation. As compressive residual stresses are introduced in the workpiece, distortions may occur. The distortions are communicated to the apparatus by contact with the first arm 308 and the second arm 310 and cause the tool to rotate or deflect about the pivot point 312. A sensor (not shown) located along the pivot point 312 registers the rotational position of the tool that can be related to the amount of distortion generated in the workpiece by the surface treatment operation.

The method of performing a surface treatment operation may be carried out in a series of steps. In a preferred embodiment of the method, prior to treating a component, a series of preliminary steps are performed, as shown in FIG. 5. In a first preliminary step 501, a residual stress distribution is designed for the workpiece and incorporated into a three dimensional model of the workpiece such that the depth and magnitude of the compressive residual stress to be induced in the workpiece is precisely defined with respect to specific locations on the part.

In a second preliminary step 502, the material from which the workpiece is constructed is characterized to establish a relationship between the surface treatment process parameters, the component dimensions, and the depth and magnitude of compressive residual stress induced. The characterization step may be accomplished empirically, by performing surface treatments with a range of operating parameters on sample materials or parts of varying dimensions and analyzing the results, or mathematically, through finite element analysis of the treatment process as performed on a computer model of the component under various operating conditions. A combination of both empirical and mathematical analysis may also be used to characterize the material. The results of the characterization are used to establish a range of acceptable, dimension dependent, operating parameters by which a component can be treated.

In a third preliminary step 503, a CNC program and tool path are developed for use with a surface enhancement apparatus such that the desired compressive residual stresses may be induced in the workpiece. The CNC program incorporates the results of preliminary steps one and two to facilitate the introduction of the desired residual compressive stresses.

Referring now to the flow diagram of one embodiment of the method of the present invention shown in FIG. 6, the compressive residual stress distribution is induced in the workpiece. It is to be understood that the following steps for inducing the residual stress distribution may be performed under computer control, such as by the CNC program developed in the preliminary steps.

In a first step 601, a surface treatment apparatus, such as the apparatus that is a subject of this invention, is positioned relative to the workpiece. In a preferred embodiment, the tool is a caliper-type tool with two surface treatment elements positioned relative to the workpiece such that opposing faces of the workpiece are treated simultaneously.

In a second step 602, the thickness of the workpiece is measured at a specific location.

In a third step 603, the surface treatment process parameters are determined for the specific location based upon the measured dimension, the depth and magnitude of the designed residual stress distribution at that location, and the previously conducted characterization of the material.

In a fourth step 604, the designed residual stress distribution is induced in the workpiece utilizing the surface treatment process parameters determined in the previous step. The residual stress distribution may be induced by a surface treatment process selected from the list including, but not limited to, burnishing, deep rolling, pinch peening, indenting, impact peening, and coining. In a preferred embodiment, the desired depth and magnitude of the induced compressive residual stress is achieved by controlling the depth to which a surface treatment element, such as a burnishing or peening element, is impinged against the surface of the workpiece.

Referring now to another embodiment of the method of performing a surface treatment shown in FIG. 7, having completed the preliminary steps, the compressive residual stress distribution is induced in the workpiece. It is to be understood that the following acts may be performed under computer control.

In a first step 701 a surface treatment apparatus, such as the apparatus that is a subject of this invention, is positioned relative to the workpiece. In a preferred embodiment, the tool is a caliper-type tool with two surface treatment elements positioned relative to the workpiece such that opposing faces of the workpiece are treated simultaneously.

In a second step 702, the thickness of the workpiece is measured at a specific location.

In a third step 703, the measured thickness is compared to the specified print dimensions for the workpiece at the same location. In a fourth step 704, if the measured dimensions are significantly beyond the print tolerances, a notation is made to that effect causing remedial measures to be taken to correct the variation or else the workpiece is discarded.

In a fifth step 705, the surface treatment process parameters are determined taking into account acceptable deviations between the measured dimensions of the workpiece and the specified print dimensions of the workpiece. The surface treatment process parameters are determined such that the desired depth and magnitude of compressive residual stress, as determined by the designed residual stress distribution, will be induced at the measured location without adverse effects to the workpiece.

In a sixth step 706, the desired residual stress distribution is induced in the workpiece. The residual stress distribution may be induced by a surface treatment process selected from the list including, but not limited to burnishing, deep rolling, pinch peening, indenting, impact peening, and coining. In a preferred embodiment, the desired depth and magnitude of the induced compressive residual stress is achieved by controlling the depth to which a surface treatment element, such as a burnishing or peening element, is impinged against the surface of the workpiece.

In a seventh step 707, the workpiece is measured a second time. The measurements taken in the seventh step 707 are used in an eighth step 708 where they are compared to the specified print dimensions of the part. Where substantial variations beyond the print tolerances have occurred, a notation is made to that effect causing remedial measures to be taken to correct the variation or else the workpiece is discarded.

The subject invention is an efficient, easily incorporated surface treatment apparatus and method for identifying dimensional variations, such as caused by other manufacturing process or damage caused by component use, such as FOD, in components during a surface treatment process so that the surface treatment process parameters can be adjusted and the desired compressive residual stress distribution achieved with a high degree of precision. Further, the present invention satisfies the need for an efficient, easily incorporated surface treatment apparatus and surface treatment method capable of determining the dimensions of a component during a surface treatment operation so that the surface treatment process parameters can be adjusted during treatment and the desired compressive residual stress distribution achieved. Preferably, the method and apparatus includes measuring the workpiece during a surface treatment operation and automatically adjusting the surface treatment process parameters relative to the measured dimensions so that the desired compressive residual stresses are induced in the surface of the workpiece.

While the method and apparatus described herein constitute preferred embodiments of the invention, it is to be understood that the invention is not limited to the precise method and apparatus and that changes may be made therein without departing from the scope of the invention. As such, the method of the present invention is not limited to the burnishing or pinch peening operations disclosed in the various embodiments but may also be applicable to other surface treatment processes such as deep rolling, indenting, impact peening, laser shocking, and the like.

What is claimed is:

1. A surface treatment apparatus for inducing a desired compressive residual stress distribution in the surface of a workpiece based on specified surface treatment process parameters, the surface treatment apparatus comprising:

at least one surface treatment element for inducing compressive residual stress in the workpiece;

at least one actuator mechanically linked to the at least one surface treatment element for contacting and impinging the at least one surface treatment element against the surface of the workpiece;

at least one sensor operatively connected to the surface treatment element for sensing the displacement of the at least one surface treatment element relative to the surface of the workpiece;

a computer control unit in electrical communication with the at least one sensor and fluidly and/or electrically connected with the at least one actuator, the computer control unit for receiving and analyzing signals from the at least one sensor and which operates to identify dimensional variations of the workpiece and to control the actuator to adjust the specified surface treatment process parameters based on the dimensional variations to achieve the desired compressive residual stress distribution.

2. The surface treatment apparatus of claim 1 further comprising:

a first arm and a second arm, wherein the at least one surface treatment element comprises first and second surface treatment elements, the first surface treatment element disposed in a tip portion of the first arm, the second surface treatment element disposed in a tip portion of the second arm, the first and second arms oriented in a caliper configuration such that the first surface treatment element and second surface treatment element are aligned in opposition to one another with the actuator mechanically linking the first arm to the second arm such that the surface treatment elements may be moved in proximity to one another, and the sensor disposed between the first arm and the second arm.

3. The surface treatment apparatus of claim 1 wherein the at least one surface treatment element is selected from the list comprising burnishing elements, deep rolling elements, indenting elements, peening elements, and coining elements.

4. The surface treatment apparatus of claim 1 wherein the actuator is selected from the list comprising hydraulic cylinders, pneumatic cylinders, solenoids, mechanical actuators and electromagnetic actuators.

5. The surface treatment apparatus of claim 1 wherein the sensor is selected from the list comprising strain gages, transducers, linear variable differential transformers (LVDT), resistive sensors, capacitive sensors, inductive sensors, optical sensors, pneumatic sensors, mechanical sensors and hydraulic sensors.

* * * * *